United States Patent [19]

Smeal

[11] Patent Number: 4,483,154
[45] Date of Patent: Nov. 20, 1984

[54] REFRIGERATED AIR CONDITIONING SYSTEM USING DIAPHRAGM PUMP

[76] Inventor: William J. Smeal, 4346 W. Maryland, Glendale, Ariz. 85301

[21] Appl. No.: 483,855

[22] Filed: Apr. 11, 1983

Related U.S. Application Data

[63] Continuation-in-part of Ser. No. 140,251, Apr. 14, 1980, abandoned.

[51] Int. Cl.³ .................... F28D 5/00; F25B 27/02
[52] U.S. Cl. .................... 62/305; 62/235.1; 62/238.4; 62/403
[58] Field of Search ............ 62/403, 238.4, 235.1, 62/323.2, 305, 507; 126/427; 165/124

[56] References Cited

U.S. PATENT DOCUMENTS

| | | | |
|---|---|---|---|
| 1,726,275 | 8/1929 | Modine | 165/124 |
| 1,913,742 | 6/1933 | Bates | 165/124 |
| 4,103,493 | 8/1978 | Schoenfelder | 60/641 |
| 4,212,172 | 7/1980 | Manno | 62/305 |
| 4,227,515 | 10/1980 | Jacob et al. | 126/427 |

Primary Examiner—William E. Wayner
Attorney, Agent, or Firm—Cahill, Sutton & Thomas

[57] ABSTRACT

A refrigeration system includes a first evaporator for evaporating a first refrigerant. The pressure exerted by the evaporated first refrigerant is used to drive a gas-driven diaphragm pump. The first refrigerant leaving the diaphragm pump is cooled and condensed by a first condenser which receives evaporatively cooled air. A motor-driven pump circulates the first refrigerant in liquid form from the first condenser back to the first evaporator. The diaphragm pump compresses a second refrigerant in gaseous form, and the compressed second refrigerant gas is circulated to a second condenser for liquification. The liquified second refrigerant is circulated to a second evaporator for absorbing heat from the medium to be refrigerated, causing the second refrigerant to evaporate to a low pressure gas which is returned to the diaphragm pump.

3 Claims, 4 Drawing Figures

REFRIGERATED AIR CONDITIONING SYSTEM USING DIAPHRAGM PUMP

CROSS-REFERENCE TO RELATED APPLICATION

This application is a continuation-in-part of co-pending patent application Ser No. 140,251, filed on Apr. 14, 1980 & now abandoned by the present applicant and entitled "SOLAR POWERED FLUID PUMP FOR REFRIGERATION SYSTEMS AND THE LIKE", which application is now abandoned.

BACKGROUND OF THE INVENTION

1. Field of the Invention

The present invention relates generally to refrigerated air conditioning systems, and more particularly, to an apparatus utilizing either solar energy or the differential of wet-bulb and dry-bulb temperatures of ambient air to evaporate a first refrigerant and utilizing the pressure developed by the evaporated first refrigerant for pumping or compressing a second refrigerant circulated within a refrigeration system.

2. Description of the Prior Art

Once abundant sources of energy such as oil and natural gas are now relatively less abundant and more expensive. As a result, utilization of solar energy has attracted much attention in the recent past. For example, it is known to employ solar energy in conjunction with a refrigeration system as disclosed in U.S. Pat. No. 4,023,948 issued to Pitts et al. The patent issued to Pitts et al. discloses a solar energy refrigeration and air conditioning system wherein a plurality of solar collectors are used to heat a fluid, and the heated fluid is circulated through a heat exchanger for vaporizing a refrigerant. The vaporized refrigerant is passed through an ejector which creates a suction for drawing refrigerant vapors from an evaporator into the ejector. The ejector is in turn coupled to a condenser wherein the refrigerant is condensed. A portion of the condensed refrigerant is recirculated to the heat exchanger by a pump. The remainder of the condensed refrigerant is circulated to an evaporator for cooling an enclosed area.

A disadvantage of the apparatus disclosed by Pitts et al. is that the fluid recirculated within the loop between the heat exchanger and the condenser is combined, within the ejector, with the fluid recirculated within the loop between the condenser and the evaporator. Thus, the suction inlet within the ejector disclosed by Pitts et al. may not be utilized for circulating a fluid other than the fluid recirculated between the heat exchanger and the condenser. This limitation precludes, for example, the use of two different refrigerants within the two different recirculation loops.

In U.S. Pat. No. 2,942,411 issued to Hutchings, an apparatus is disclosed which utilizes solar energy to compress a gas, the compressed gas being stored for subsequent utilization by an air motor for generating electricity. In the apparatus disclosed by Hutchings, water is circulated through a solar boiler for creating steam which drives a turbine for turning a gas compressor. The gas compressor is utilized to compress a non-liquified gas such as methane. However, the solar boiler used to create the steam required collectors which optically concentrate the sun rays, such as parabolically shaped mirrored reflectors. Construction of such solar boilers for creating steam from water is complex and expensive.

Moreover, systems which utilize solar energy of the type described in the above mentioned patents are typically operative only during daylight hours and only when the intensity of the sun is relatively strong. Such systems are not actively driven on cloudy days or at night.

U.S. Pat. No. 4,103,493, issued to Schoenfelder, discloses an apparatus utilizing a solar collector for boiling a refrigerant. The boiled refrigerant is conducted to a Rankine cycle engine for generating rotary motion. The rotary motion created by the Rankine cycle engine is transmitted through a gear box to rotate a conventional compressor within a heat pump system. The use of a Rankine cycle engine to create rotary motion may be advantageous in some respects, for example, to drive an electrical generator as shown by Schoenfelder. However, the transformation of the energy contained within the pressurized refrigerant to rotary motion and the subsequent retransformation of such rotary motion to pressurize a gas within a compressor presents some disadvantages. Energy losses due to friction within the gear box and within the compressor of the Schoenfelder apparatus reduce the efficiency of energy transfer from the solar collection circuit to the heat pump system. Moreover, both the physical size and expense of the combination of the Rankine cycle engine, the gear box and the compressor are considerable.

Accordingly, it is an object of the present invention to provide an apparatus for compressing a refrigerant within a refrigeration system, the apparatus utilizing solar energy for vaporizing a driving fluid while maintaining physical isolation between the driving fluid and the refrigerant to be compressed.

Another object of the present invention is to provide an apparatus utilizing solar energy for compressing a refrigerant within a refrigeration system wherein conventional flat solar panels may be used for collecting solar energy, thereby avoiding the complexity and expense of optical concentration-type solar collectors.

It is still another object of the present invention to provide an apparatus for compressing a refrigerant within a refrigeration system, the apparatus being adapted to utilize heat extracted from the surroundings for vaporizing a driving fluid in order to compress the refrigerant.

A further object of the present invention is to provide a refrigeration system which may utilize solar energy for vaporizing a driving fluid wherein the driving fluid may be different from a refrigerant circulated within the refrigeration system.

A yet further object of the present invention is to provide a refrigeration system which can extract heat from the surroundings to vaporize a driving fluid which can be used to recirculate a refrigerant within the refrigeration system.

A still further object of the present invention is to provide a refrigeration system adapted to utilize the temperature differential between wet-bulb and dry-bulb temperatures to create a pressure differential within a first refrigerant circuit, and to utilize the pressure differential thereby produced to compress a second refrigerant within a second refrigerant circuit.

Yet another object of the present invention is to provide a relatively simple, and efficient, and inexpensive refrigerated air conditioning system suitable for refrigerating the air within a home, which refrigeration system substantially reduces the amount of electrical power typically required to cool the home.

SUMMARY OF THE INVENTION

Briefly described, and in accordance with a first embodiment thereof, the present invention relates to an apparatus for pumping a fluid, such as a refrigerant gas within a refrigeration system, the apparatus including a solar collector for absorbing solar energy to evaporate a low temperature boiling point refrigerant to form a pressurized gas. The pressurized gaseous refrigerant operates a gas-driven fluid pump, the gas-driven fluid pump having a driving inlet and a driving outlet through which the pressurized gaseous refrigerant flows. The gas-driven fluid pump also has a pump inlet and a pump outlet for circulating the fluid to be pumped. From the gas-driven fluid pump, the pressurized gaseous refrigerant is passed to a condenser for converting the refrigerant back to liquid form. The condenser may be a wet coil forced-air type for increased cooling efficiency. A liquid pump is provided for recirculating the liquid refrigerant from the condenser back to the solar collector. The liquid pump may be powered by a conventional electric motor or by the pressurized gaseous refrigerant itself. An auxiliary evaporator may be provided in parallel with the solar collector for extracting heat from the surrounding air in order to evaporate the refrigerant on overcast days or at night. Control circuitry is provided for selecting whether the liquid refrigerant is passed into the solar collector or into the auxiliary evaporator for evaporation.

The gas-driven fluid pump may be used to compress a second refrigerant circulated within a refrigeration system. The second refrigerant is circulated in gaseous form to the pump inlet of the gas-driven fluid pump and compressed thereby. The compressed second refrigerant is circulated to a second condenser, and the condensed second refrigerant is circulated to an evaporator for withdrawing heat from the medium to be refrigerated. The second refrigerant vaporized by the evaporator is directed back to the pump inlet of the gas-driven fluid pump, and the cycle is repeated.

A second embodiment of the present invention relates to a refrigeration system for refrigerating air or another medium within an enclosed space such as a home or other building wherein a first evaporator is adapted to absorb heat from its surroundings and to transfer the absorbed heat to a first refrigerant. While the first evaporator may be a solar collector, it may advantageously be formed of a simple heat exchanger coil through which ambient air may be passed. The first refrigerant is received in liquid form through an inlet to the first evaporator and is vaporized by the first evaporator to a gas under relatively high pressure. The pressurized first refrigerant is passed through an outlet of the first evaporator to the driving inlet of a diaphragm pump.

The diaphragm pump is of a type including an expansion chamber and a compression chamber separated from one another by a deformable diaphragm. The driving inlet admits the pressurized first refrigerant into the expansion chamber, while a driving outlet subsequently exhausts the first refrigerant at reduced pressure from the expansion chamber. The diaphragm pump also includes a pump inlet for admitting a second refrigerant gas into the compression chamber at a relatively low pressure, as well as a pump outlet for exhausting the second refrigerant gas at relatively higher pressure from the compression chamber. The diaphragm pump includes a series of valves to properly sequence the opening and closing of the various inlets and outlets. The pressurized first refrigerant gas admitted into the expansion chamber displaces the deformable diaphragm to compress the second refrigerant gas within the compression chamber. The driving outlet of the diaphragm pump is then opened to release the first refrigerant gas from the expansion chamber, and the cycle is repeated.

A first condenser receives the first refrigerant gas exhausted by the diaphragm pump. The first condenser includes heat exchange surfaces for transferring heat from the first refrigerant to the surrounding air to condense the first refrigerant to a liquid. Evaporatively cooled air is drawn through the first condenser to pass over the heat exchange surfaces thereof. Due to the differential between wet-bulb and dry-bulb temperatures of the surrounding air, the air passing through the first condenser is significantly cooler than the air passing over the first evaporator. The evaporatively cooled air stream is preferably produced by providing a precooler incorporating a wetted evaporative media adjacent to the air entry face of the first condenser and by providing a fan on the opposite side of the first condenser to draw air through the precooler and into the air entry face of the first condenser.

A motor driven pump is disposed between the outlet of the first condenser and the inlet of the first evaporator to pump the condensed first refrigerant back into the first evaporator for recirculation.

A second condenser is also provided to receive the compressed second refrigerant from a pump outlet of the diaphragm. Like the first condenser, the second condenser includes heat exchange surfaces for transferring heat from the second refrigerant gas to surrounding air to condense the second refrigerant to a liquid. Preferably, the second condenser is mounted parallel to and adjacent the first condenser for allowing the aforementioned evaporatively cooled air stream to pass serially through the first and second condensers.

The condensed second refrigerant provided by the second condenser is coupled to the inlet of a second evaporator disposed within the home or other space to be refrigerated. A blower passes the air to be refrigerated over heat exchange surfaces of the second evaporator to transfer heat from the blown air to the second refrigerant. The second refrigerant is thereby evaporated within the second evaporator and is circulated from the second evaporator to the pump inlet of the diaphragm pump to be recycled.

The first and second condensers, precooler, exhaust fan, first evaporator, and the diaphragm pump may all be advantageously mounted within a compact housing having first, second, and third openings. The first and second condensers, as well as the precooler, are mounted adjacent the first opening through which a first stream of air is admitted into the housing to evaporatively cool the first and second condensers. The first evaporator is mounted adjacent a second opening through which a second stream of air is admitted into the housing to transfer heat to the first evaporator. The exhaust fan is mounted adjacent the third opening to simultaneously draw the first and second air streams into the housing through the first and second openings and to exhaust such air streams from the housing.

DESCRIPTION OF THE PREFERRED EMBODIMENTS

Figure 1:
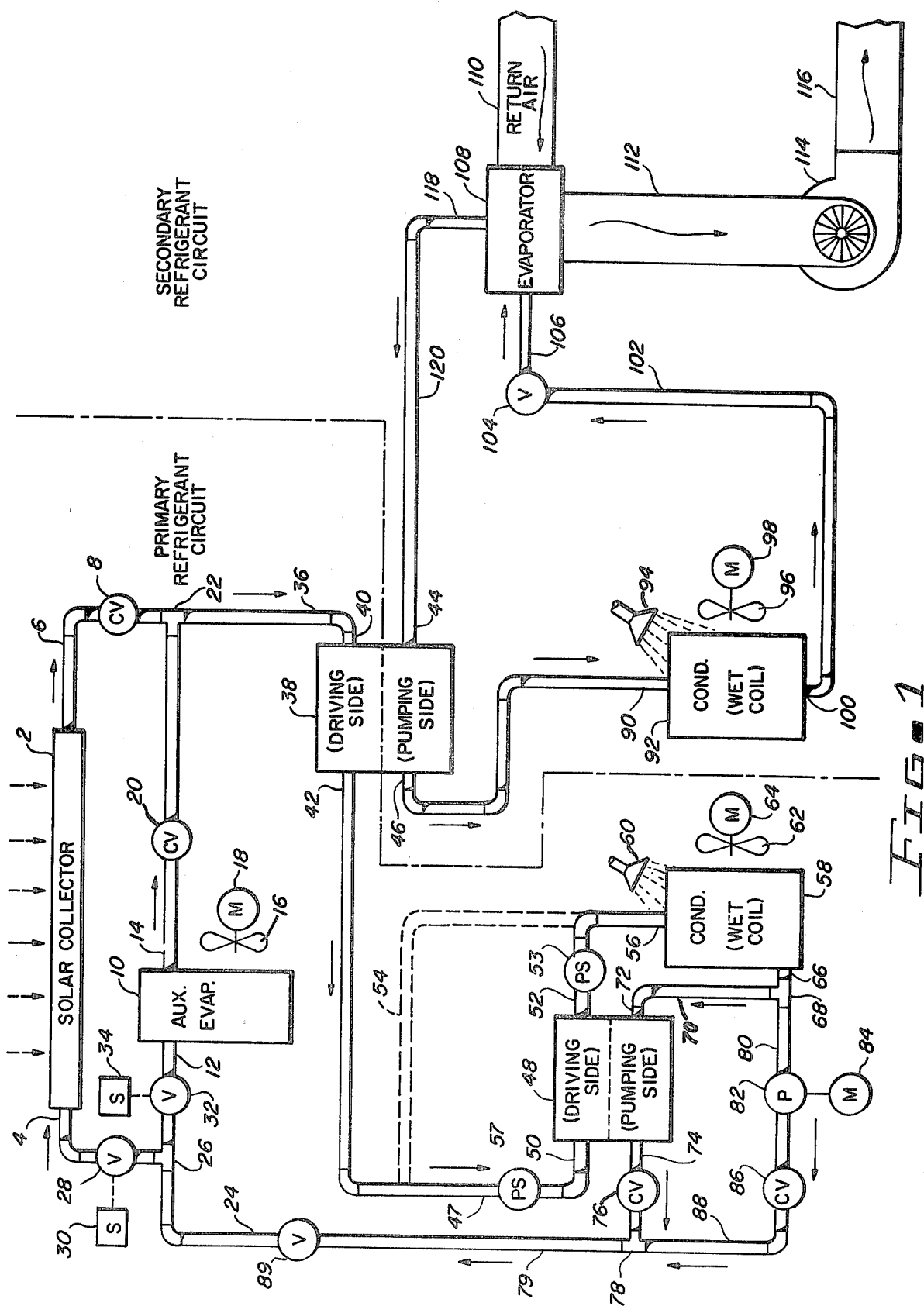
FIG. 1 is a schematic illustration of a solar powered refrigeration system.

In FIG. 1, a flat panel-type solar collector 2 has an inlet 4 for receiving a liquid refrigerant. Solar 2 collector absorbs solar energy which heats the liquid refrigerant and causes it to evaporate to a high pressure gas. The pressurized gaseous refrigerant passes through outlet conduit 6 and through a check valve 8 into T-shaped fitting 22.

An optional auxiliary evaporator 10 has an inlet coupled to conduit 12 for receiving liquid refrigerant. Auxiliary evaporator 10 may be used to evaporate the liquid refrigerant at night or on overcast days when the efficiency of solar collector 2 is diminished. The pressurized gaseous refrigerant passes from auxiliary evaporator 10 through outlet conduit 14 and through check valve 20 into T-shaped fitting 22. Fan 16, powered by electric motor 18, forces warm outdoor air over auxiliary evaporator 10 for heating the liquid refrigerant contained therein. Auxiliary evaporator 10 may be constructed from copper tubing having copper fins attached thereto for allowing a rapid exchange of heat from the outdoor air to the liquid refrigerant.

A liquid refrigerant supply conduit 24 is coupled to T-shaped fitting 26. One branch of T-shaped fitting 26 is coupled to inlet 4 of solar collector 2 by a valve 28 controlled by solenoid 30. A second branch of T-shaped fitting 26 is coupled to the inlet conduit 12 of auxiliary evaporator 10 by a valve 32 controlled by solenoid 34. Control circuitry (not shown) for controlling solenoids 30 and 34 is provided for selecting whether solar collector 2 or auxiliary evaporator 10 is used to evaporate the liquid refrigerant. For example, a light sensor may be coupled to an amplifier for indicating the amount of light being received by solar collector 2. The amplifier could, in turn, actuate a relay for energizing either solenoid 30 or solenoid 34 in response to the signal generated by the light sensor.

The pressurized gaseous refrigerant generated by either solor collector 2 or auxiliary evaporator 10 is passed through T-shaped fitting 22 and through conduit 36 to gas-driven fluid pump 38. Gas-driven fluid pump 38 includes a driving inlet 40 coupled to conduit 36 for receiving the gaseous refrigerant under relatively high pressure and also includes a driving outlet 42 for releasing the gaseous refrigerant to a region of relatively lower pressure. Gas-driven fluid pump 38 also includes a pump inlet 44 for receiving the fluid to be pumped and a pump outlet 46 for releasing the pumped fluid. In response to the difference between the pressure of the gaseous refrigerant at the driving inlet and the pressure of the gaseous refrigerant at the driving outlet, gas-driven fluid pump 38 causes a fluid to be pumped from pump inlet 44 to pump outlet 46.

Gas-driven fluid pump 38 may be one of several types of gas-driven reciprocating piston pumps commercially available from Haskel, Inc., Engineered Products Division, Burbank, Calif. For example, if the fluid to be pumped is a liquid, then pump 38 may be of the type known as an air-driven liquid pump. Alternatively, if the fluid to be pumped is a gas, then pump 38 may be of the type known as an air-driven gas booster compresser. Both of the above mentioned types of pumps are simple ratio pumps utilizing a large area drive piston with low pressure air or gas to produce higher pressure fluids from a smaller area. The pistons automatically reciprocate by the action of a pilot operated selecter valve and a return spring.

The driving outlet 42 of gas-driven fluid pump 38 is coupled by conduit 47 to the driving inlet 50 of gas-driven liquid pump 48. As will be explained below, the function of gas-driven liquid pump 48 is to circulate liquid refrigerant to solar collector 2 and auxiliary evaporator 10. As will also be explained below, a conventional electric motor driven liquid pump may be used for recirculating the liquid refrigerant, in which case bypass conduit 54 (shown in dashed lines within the figure) passes gaseous refrigerant directly to a condenser.

As shown in the figure, gas-driven liquid pump 48 includes a driving outlet 52 for releasing low pressure gaseous refrigerant. Pressure sensing devices 51 and 53 are positioned on the driving inlet and driving outlet sides, respectively, of gas-driven liquid pump 48. The purpose of pressure sensing devices 51 and 53 will be explained below. Driving outlet 52 of gas-driven liquid pump 48 is coupled to the inlet 56 of a condenser 58.

In the embodiment of the present invention illustrated by the figure, gas-driven fluid pump 38 and gas-driven liquid pump 48 are shown having their driving sides coupled in series with each other. Alternatively, pumps 38 and 48 may be coupled in parallel wherein driving inlet 50 of pump 48 is coupled to driving inlet 40 of pump 38 and driving oulet 42 of pump 38 is coupled to driving outlet 52 of pump 48. In this instance, pressure sensing device 51 would be relocated to the driving inlet sides of pump 38 and pump 48.

Condenser 58 may be a wet coil type condenser having a cooling coil made of copper tubing having attached copper fins for rapidly conducting heat away from the refrigerant circulated therethrough. A spray head 60 directs a mist of water onto the copper tubing and copper fins for wetting the exterior surface of the cooling coil. Spray head 60 may be coupled to an electric motor driven water pump connected to a supply of water. A fan 62 driven by electric motor 64 forces air over the cooling coil for removing heat from the surfaces thereof. Cooling due to evaporation of the water sprayed on the surfaces of the cooling coil increases the cooling efficiently of condenser 58, particularly in arid climates where humidity is relatively low. The removal of heat from the refrigerant circulated within condenser 58 causes the refrigerant to condense back to liquid form. An outlet 66 supplies condensed liquid refrigerant from condenser 58.

Within the FIG. 1, auxiliary evaporator 10 and condenser 58 are shown physically separated from one another. However, auxiliary evaporator 10 and condenser 58 may be arranged within a single housing, in which case a single fan and electric motor can simultaneously force air to flow across both auxiliary evaporator 10 and condenser 58.

Outlet 66 of condenser 58 is coupled to a T-shaped fitting 68. One branch of T-shaped fitting 68 is coupled by conduit 70 to the pump inlet 72 of gas-driven liquid pump 48. Gas-driven liquid pump 48 pumps liquid refrigerant to pump outlet 74 and through check valve 76 to a T-shaped fitting 78. The second branch of T-shaped fitting 68 is coupled by conduit 80 to a conventional vane or impeller-type pump 82 driven by electric motor 84. Pump 82 circulates liquid refrigerant through check valve 86 and through conduit 88 to T-shaped fitting 78.

Pump 82 may serve as a priming pump for initially circulating liquid refrigerant to solar collector 2 or auxiliary evaporator 10 upon initial startup. After sufficient refrigerant has been evaporated and a relatively high pressure established, gas-driven liquid pump 48 will become operative, and electric motor 84 may be turned off. The time at which motor 84 can be switched off is determined by control circuitry (not shown) responsive to pressure sensing devices 51 and 53. When the difference in pressure across the driving inlet and driving outlet sides of gas-driven liquid pump 48, as indicated by pressure sensing devices 51 and 53, is sufficiently large to guarantee that pump 48 is operative, electric power is cut off to motor 84.

In an alternate embodiment of the present invention, gas-driven liquid pump 48 is omitted and liquid pump 82 is the sole means for circulating liquid refrigerant from condenser 58 to solar collector 2 and auxiliary evaporator 10. In this embodiment, gaseous refrigerant released by driving outlet 42 of gas-driven fluid pump 38 is bypassed by conduit 54 directly into inlet 56 of condenser 58.

Liquid refrigerant pumped by either pump 48 or pump 82 is passed from T-shaped fitting 78 through conduit 79 to a pressure regulating valve 89 which releases liquid refrigerant into supply conduit 24. The liquid refrigerant within supply conduit 24 is again circulated into solar collector 2 or auxiliary evaporator 10 for evaporation, and the cycle is continuously repeated.

The refrigerant circulation loop described above forms a primary refrigerant circuit. Also shown in the figure is a secondary refrigerant circuit adapted to refrigerate an enclosed area, such as the interior of a building. A second refrigerant, which may be the same as or different from the first refrigerant circulated within the primary refrigerant circuit, is circulated within the secondary refrigerant circuit. The second refrigerant is received as a low pressure gas by pump inlet 44 of pump 38. The second refrigerant is compressed by pump 38 and is released by pump outlet 46 as a compressed or relatively high-pressured gas.

The compressed gaseous second refrigerant is received by inlet 90 of a second condenser 92 for condensing the second refrigerant to liquid form. Like condenser 58, condenser 92 includes a cooling coil made of copper tubing and having copper fins for rapidly conducting heat away from the second refrigerant circulated therethrough. Condenser 92 may also be a wet coil type condenser, in which case spray head 94 directs a mist of water onto the exterior surfaces of the cooling coil within condenser 92. Spray head 94 is coupled to an electric motor driven water pump (not shown) coupled to a supply of water. Fan 96 is driven by electric motor 98 for forcing air over the surfaces of the cooling coil within condenser 92.

Condenser 92 includes an outlet 100 for supplying the second refrigerant in condensed liquid form. Conduit 102 couples outlet 100 to a pressure regulating valve 104 which releases the second refrigerant in pressurized liquid form into inlet 106 of evaporator 108. Like auxiliary evaporator 10, evaporator 108 includes a heat exchanging coil made of copper tubing and copper fins for rapidly conducting heat to the second refrigerant circulated therethrough. A return air duct 110 directs air to be refrigerated over the surfaces of the cooling coil within evaporator 108. Heat contained by the returned air within duct 110 is given off to evaporator 108 for evaporating the second refrigerant circulated therethrough. The air thus cooled is then directed through a duct 112 to a conventional blower 114 which forces the cooled air through a distribution duct 116 for distribution to the enclosed area.

Evaporator 108 includes an outlet 118 through which the evaporated second refrigerant is released as a low pressure gas. The gaseous second refrigerant is passed through conduit 120 to pump inlet 44. Pump 38 compresses the low pressure gaseous second refrigerant, and the cooling cycle is continuously repeated.

Within the refrigeration system illustrated by the figure, the refrigerant circulated within the primary refrigerant circuit, i.e., through solar collector 2, is preferably R-22 ($CHClF_2$). The refrigerant circulated within the secondary refrigerant circuit, i.e., through evaporator 108, is R-114 ($CClF_2CClF_2$), the refrigerant most widely used in conventional refrigeration systems. Refrigerant R-22 is used within the primary refrigerant circuit because it has a significantly higher vapor pressure than refrigerant R-114 at any given outdoor temperature. For example, at 100 degrees Fahrenheit, the vapor pressure of refrigerant R-22 is approximately 196 PSIG whereas the vapor pressure of refrigerant R-114 at 100 degrees Fahrenheit is approximately 31 PSIG. In addition to having a larger absolute vapor pressure at any given temperature, refrigerant R-22 also exhibits a larger change in vapor pressure for a given change in temperature.

The difference in the vapor pressure exerted by refrigerant R-22 within solar collector 2 (or within auxiliary evaporator 10) and the vapor pressure exerted by refrigerant R-22 within condenser 58 is of a sufficient magnitude to power pumps 38 and 48. For example, if the temperature of refrigerant R-22 within auxiliary evaporator 10 is 100 degrees Fahrenheit, the vapor pressure exerted by it is approximately 196 PSIG. If condenser 58 cools the refrigerant R-22 to 85 degrees, the vapor pressure drops to approximately 156 PSIG. Thus, a pressure differential of 40 PSIG is present for driving pump 38 and pump 48. During daylight operation when the intensity of the sun is fairly strong, (and coincidentally when refrigeration is most needed), the temperature differential of the refrigerant within solar collector 2 and within condenser 58 will typically exceed the 15 degree Fahrenheit temperature differential assumed in the example above, thereby establishing an even larger pressure differential to drive pumps 38 and 48. During night time operation, the use of wet coil type condenser 58 creates a wet-bulb/dry-bulb temperature differential between auxiliary evaporator 10 and condenser 58 which typically results in a vapor pressure differential sufficient to power pumps 38 and 48.

In order to operate the refrigeration system shown in FIG. 1, a thermostatic switch would typically be provided within the enclosed area to be refrigerated for indicating when cooling is desired. In response to the actuation of the thermostatic switch, fan motors 18, 64 and 98 would be energized. Electric motor driven water pumps coupled to spray head 60 and 94 would also be energized in response to the actuation of the thermostatic switch. A time delay circuit (not shown) may be coupled between the thermostatic switch and the priming pump motor 84 for delaying actuation of pump 82 for a period of one to two minutes after the thermostatic switch is actuated for allowing condensers 58 and 92 to become cool. Priming pump 82 would then remain operative until pressure sensing devices 51 and 53 indicate that a sufficient pressure differential has been developed for operating pump 48.

Figure 2:
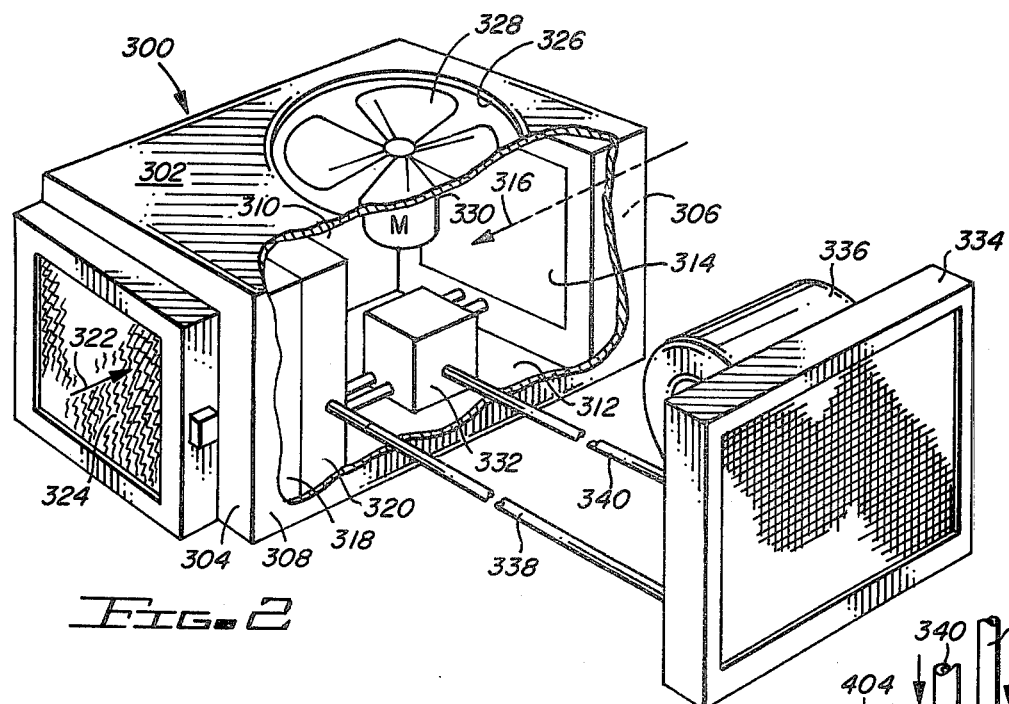
FIG. 2 is a partially cut away perspective view of a refrigeration system which utilizes the temperature differential between wet-bulb and dry bulb air temperatures to compress a refrigerant gas within the refrigeration system.

Referring now to FIG. 2, a refrigerated air conditioning system is shown which utilizes the temperature differential between wet-bulb and dry-bulb temperatures of outdoor air to drive a pump which compresses a refrigerant gas within the refrigeration system. The refrigeration system shown in FIG. 2 includes a housing 300 having a top wall 302, first and second opposing sidewalls 304 and 306, front and rear walls 308 and 310, respectively, and a floor 312. A first evaporator 314 is positioned within housing 300 adjacent sidewall 306. A hole (not shown) within sidewall 306 allows air to pass freely over first evaporator 314 in the direction designated by arrow 316. First evaporator 314 is preferably formed as coils of tubing made of copper or aluminum to which heat exchange fins have been attached for transferring heat contained within the air passing over such heat exchange fins to the fluid conducted by the coiled tubing.

Also within housing 300 is a first condenser 318 located parallel to and adjacent sidewall 304. A second condenser 320 extends parallel to and adjacent first condenser 318. First condenser 318 and second condenser 320 are each formed in a manner similar to that described for first evaporator 314 and include fins or other heat exchange surfaces for transferring heat from fluids circulated within such condensers to the air surrounding such heat exchange fins. A hole (not shown) is formed within sidewall 304 for permitting air to flow serially through first condenser 318 and second condenser 320 in the direction shown by arrow 322.

Still referring to FIG. 2, a precooler 324 is mounted against the outer face of sidewall 304 and covers the hole (not shown) formed therein. Precooler 324 includes an evaporative media, such as CELdek ® (a registered trademark of the Munters Corporation) evaporative media, over which water is circulated to provide a wetted surface. As air is passed through precooler 324 in the direction shown by arrow 322, the air is evaporatively cooled by the wetted surfaces of the evaporative media. Depending upon the evaporative efficiency of precooler 324, the air passing therethrough is cooled more or less toward the wet-bulb temperature of the ambient air. Wet-bulb temperature is measured with a wetted wick on the bulb of a thermometer. The heat of vaporization required for the evaporation of the water from the wick will remove heat from the bulb of the thermometer. Thus, the wet-bulb temperature is dependent upon the humidity of the air. Precoolers of the type described above are commercially available from several manufacturers, including Energy Saver Manufacturing Company of Chandler, Ariz.

As further shown in FIG. 2, top wall 302 has a hole formed therein, the periphery of which is designated by reference numeral 326. Air may be exhausted from housing 300 through hole 326 by a fan 328 driven by electric motor 330. When motor 330 is operated, the suction created by fan 328 causes a first stream of air to be drawn through precooler 324; the evaporatively cooled stream of air leaving precooler 324 passes serially through first condenser 318 and second condenser 320 toward fan 328. The suction induced by fan 328 also causes a second stream of air to be drawn through first evaporator 314 toward fan 328. These first and second streams of air are exhausted from housing 300 through hole 326.

Also shown within housing 300 is a box 332 which contains a diaphragm pump and a small pump driven by an electric motor, each of which will be described in greater detail below.

A second evaporator 334 is also shown within FIG. 2. Second evaporator 334 is normally disposed remote from housing 300, either within the home or other enclosed space to be refrigerated, or within the cooling ducts which communicate with the enclosed space to be cooled. The physical structure of second evaporator 334 may be similar to that previously described for first evaporator 314. In addition, a blower 336, conventionally driven by an electrical motor, is provided to circulate the air or other medium to be cooled through the heat exchange surfaces of second evaporator 334 to transfer heat from the blown air to a refrigerant circulated within second evaporator 334. As also shown within FIG. 2, a pair of tubes 338 and 340 extend between second evaporator 334 and housing 300 for circulating a refrigerant therebetween.

Figure 3:
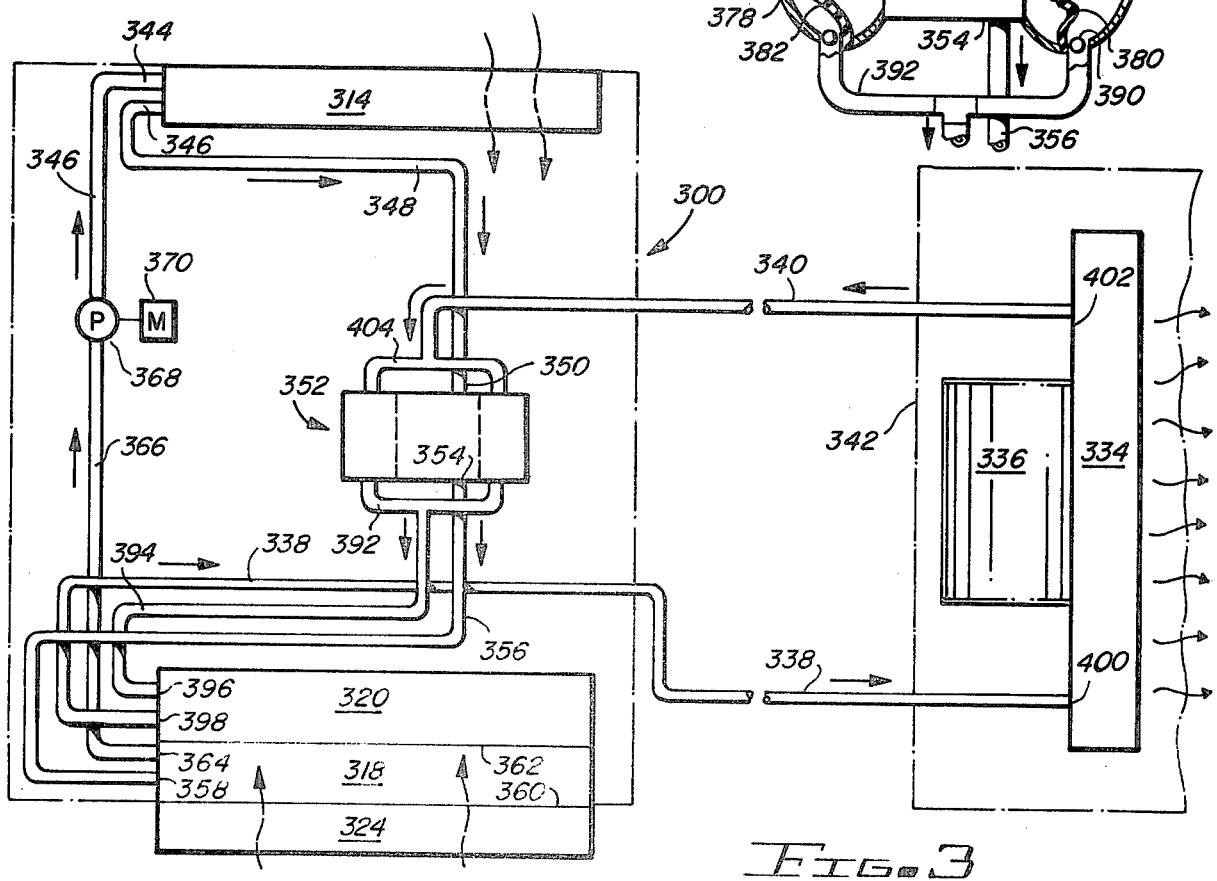
FIG. 3 is a schematic representation of the refrigeration system shown in FIG. 2.

FIG. 3 is a schematic representation of the components generally shown within FIG. 2, with the exception that fan 328 and electric motor 330 have been omitted for clarity. Dashed lines 300 outline the perimeter of housing 300, while dashed lines 342 represent the enclosed space to be refrigerated.

It will be recalled that first evaporator 314 is used to absorb heat from the ambient air and to transfer the absorbed heat to a first refrigerant. First evaporator 314 receives the first refrigerant through an inlet port 344 from tube 346. Within this embodiment of the invention, the first refrigerant is preferably type R-12 which has a chemical formula of $CCl_2F_2$. While not shown, an expansion valve is typically provided at inlet 344 for regulating the release of the first refrigerant into first evaporator 314. The first refrigerant is received by evaporator 314 in liquid form and is quickly vaporized therein due to the heat transferred to the first refrigerant from the air being drawn through first evaporator 314. The vaporized first refrigerant is passed under relatively high pressure through outlet port 346 and is conducted by tube 348 to the driving inlet 350 of diaphragm pump 352, described in greater detail below in reference to FIG. 4. Diaphragm pump 352 includes a driving outlet 354 for exhausting the first refrigerant under relatively lower pressure into tube 356. Tube 356 is in turn coupled to inlet 358 of first condenser 318. The first refrigerant is circulated through the heat exchange coils of first condenser 318 and is condensed by transferring heat to the evaporatively cooled air stream exiting precooler 324. Reference numeral 360 indicates the air entry face of first condenser 318, while reference numeral 362 designates the air exit face thereof.

The condensed first refrigerant leaves first condenser 318 through outlet 364 and is conducted by tube 366 to the inlet of a liquid pump 368 driven by an electric motor 370. Liquid pump 368 may be of the type commercially available from the Viking Pump Division of Houdaille Industries, Inc., of Cedar Falls, Ia., general purpose pumps, series 32 and 432. In the preferred embodiment of this invention, electric motor 370 is a one-third Horsepower motor operated at 230 V A.C. at 3.4 Amps. The outlet of liquid pump 368 is coupled to tube 346 for pumping the first refrigerant in liquid form back to first evaporator 314.

Figure 4:
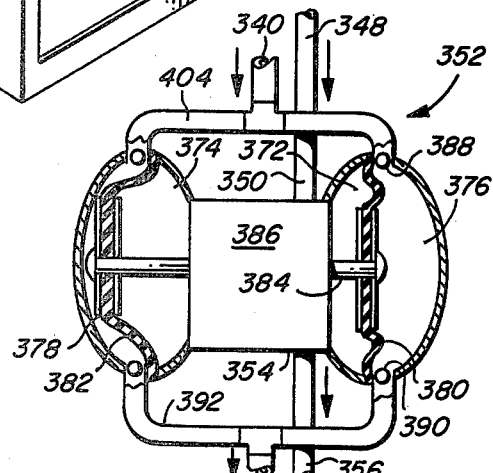
FIG. 4 is a cross-section view of the diaphragm pump schematically represented in FIG. 3.

Referring briefly to FIG. 4, diaphragm pump 352 is shown in greater detail. Preferably, diaphragm pump 352 is of the type known as a double diaphragm pump commercially available from Wilden Pump & Engineering Co. of Colton, Calif., under model M-2. Such pumps are generally recommended by the manufacturer to be driven by compressed air, but the present inventor has determined that such double diaphragm pumps may also be driven with a pressurized refrigerant gas. As shown in FIG. 4, the double diaphragm pump 352 includes first and second expansion chambers 372 and 374. Diaphragm pump 352 further includes two compression chambers 376 and 378. Expansion chamber 372 is separated from compression chamber 376 by a deformable diaphragm 380. Similarly, deformable 382 separates expansion chamber 374 from compression chamber 378. A reciprocating shaft 384 interconnects diaphragms 380 and 382 to one another and slides within a valve assembly 386. Valve assembly 386 alternately admits the first refrigerant under relatively high pressure into expansion chambers 372 and 374 in opposite phases to reciprocate diaphragms 380 and 382, and hence, to reciprocate connecting shaft 384. Valve assembly 386 operates to exhaust the first refrigerant under relatively lower pressure from one of expansion chambers 372 and 374 as the other of such expansion chambers receives the first refrigerant under relatively higher pressure from driving inlet 350. As expansion chamber 372 admits the first refrigerant under relatively higher pressure, diaphragm 380, and shaft 384, move to the right (with respect to FIG. 4,) for compressing a second refrigerant gas within compression chamber 376. A pair of ball valves 388 and 390 regulate the entry of the second refrigerant into compression chamber 376 and the release of the compressed second refrigerant therefrom into pump outlet 392. After shaft 384 has completed its movement to the right, valve assembly 386 vents expansion chamber 372 to driving outlet 354 while permitting the pressurized first refrigerant to pass from driving inlet 350 into expansion chamber 374. Diaphragm 382 and shaft 384 are then moved to the left (with respect to FIG. 4) for compressing the second refrigerant gas within compression chamber 378. The above-described cycle is repeated continuously.

Referring again to FIG. 3, the compressed second refrigerant gas exhausted through pump outlet 392 is conducted by tube 394 to the inlet 396 of second condenser 320. The hot compressed second refrigerant gas directed into second condenser 320 is condensed by the evaporatively cooled air stream which leaves the air exit face 362 of first condenser 318 and continues to pass through second condenser 320. The condensed second refrigerant exits second condenser 320 through outlet 398 and is conducted by tube 338 to inlet 400 of second evaporator 334. While not shown, an expansion valve is provided at inlet 400 for regulating the inflow of the second refrigerant into second evaporator 334.

In the embodiment of the present invention illustrated within FIG. 3, the second refrigerant gas is preferably refrigerant type R-114 which has a chemical formula of $CClF_2 \cdot CClF_2$. The second refrigerant is vaporized within second evaporator 334 as heat is transferred from the air blown across second evaporator 334 to the second refrigerant. The vaporized second refrigerant exits second evaporator 334 through outlet 402 and is conducted by tube 340 to pump inlet 404 of diaphragm pump 352 for alternately being discharged into either compression chamber 376 or compression chamber 378.

As an example of the conditions under which the refrigeration system shown within FIGS. 2-4 might be operated, it shall be presumed that the outdoor air temperature is 110° F. that the temperature of the evaporatively cooled air exhausted from the precooler is approximately 85° F. and that the temperature of the evaporatively cooled air stream rises to approximately 90° F. after exiting from the first condenser and before entering the second condenser. Under such operating conditions, the pressure of the R-12 refrigerant within first evaporator 314 is approximately 136.4 PSIG, while the pressure of the R-12 refrigerant within first condenser 318 is approximately 91.8 PSIG, creating a pressure differential of approximately 44.6 PSIG across the driving inlet and driving outlet ports of diaphragm pump 352. In addition, the pressure of the R-114 refrigerant within the second condenser 320 is approximately 42.1 PSIG. Given the aforementioned pressure differential across diaphragm pump 352 and the temperature and pressure of the R-114 within secondary condenser 320, the present inventor has determined that the temperature of the R-114 refrigerant within the second evaporator 334 should be approximately 50° F. at 3.8 PSIG.

The power savings obtainable from the refrigeration system shown within FIGS. 2-4 on hot days of relatively low humidity are considerable. Whereas a conventional electric motor used to power a compressor within a typical refrigerated air conditioning system for a home may easily draw 30 Amps at 230 V.A.C., the refrigeration system shown within FIGS. 2-4 eliminates such a compressor motor and substitutes only motor 370 to power liquid pump 368, which motor 370 requires a mere 3.4 Amps at the same voltage. Of course, on days of high relative humidity, the temperature differential between the air circulated through the first evaporator 314 and through the first condenser 318 will not be as great, resulting in a reduced pressure differential with which to operate diaphragm pump 352. Nonetheless, in many arid and semi-arid areas of the world, such a refrigeration system can provide significant electrical power savings. Moreover, such a refrigeration system is not dependent upon solar energy and may operate on a 24 hour basis.

While the present invention has been described with reference to several preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A refrigeration system for refrigerating air within an enclosed space, said refrigeration system comprising in combination:

a. a first evaporator having an inlet for receiving a first refrigerant in liquid form, said first evaporator including a plurality of heat exchange surfaces for absorbing heat from the ambient air surrounding the heat exchange surfaces thereof to vaporize the first refrigerant to gaseous form under relatively high pressure, said first evaporator having an outlet for exhausting said first refrigerant in gaseous form;

b. a diaphragm pump having a driving inlet coupled to the outlet of said first evaporator for receiving said first refrigerant in gaseous form under relatively high pressure and having a driving outlet for releasing said first refrigerant in gaseous form under relatively low pressure, said diaphragm pump having a pump inlet for receiving a second refrigerant in gaseous form under relatively low pressure, said diaphragm pump also having a pump outlet, said diaphragm pump including at least one expansion chamber and at least one compression chamber separated from one another by a deformable diaphragm, said diaphragm pump further including valve means to alternately couple the driving inlet of said diaphragm pump to the expansion chamber for allowing the first refrigerant gas to fill the expansion chamber and thereby compress the second refrigerant and force the second refrigerant from the compression chamber under relatively high pressure outwardly through the pump outlet, while alternately coupling the expansion chamber to the driving outlet to exhaust the first refrigerant gas from the expansion chamber and coupling the compression chamber to the pump inlet to be filled with the second refrigerant gas;

c. a first condenser having an inlet coupled to the driving outlet of said diaphragm pump for receiving the first refrigerant in gaseous form under relatively low pressure, said first condenser causing the first refrigerant to condense to liquid form, said first condenser including an outlet for supplying the first refrigerant in liquid form, said first condenser including a plurality of heat exchange surfaces for transferring heat from the first refrigerant to air surrounding the heat exchange surfaces of said first condenser, said first condenser including an air entry face through which a stream of air is passed into said first condenser as well as an air exit face opposite thereto;

d. precooler means for causing evaporatively cooled air to pass over the heat exchange surfaces of said first condenser, said precooler means including a fan for drawing a stream of air through the air entry face of said first condenser, said fan being disposed closer to the air exit face of said first condenser than to the air entry face thereof, and a wetted evaporative media disposed proximate to the air entry face of said first condenser for precooling the air stream drawn through said first condenser by said fan and thereby creating a temperature differential between the dry-bulb temperature of the ambient air surrounding said first evaporator and the wet-bulb temperature of the air stream drawn through said first condenser;

e. a motor driven pump having a pump inlet coupled to the outlet of said first condenser for receiving the first refrigerant in liquid form and having a pump outlet coupled to the inlet of said first evaporator, said motor driven pump operating to pump the first refrigerant in liquid form from said first condenser to said first evaporator;

f. a second condenser having an inlet coupled to the pump outlet of said diaphragm pump for receiving said compressed second refrigerant, said second condenser causing the second refrigerant to condense to a liquid form, said second condenser having an outlet for supplying the second refrigerant in liquid form, said second condenser including a plurality of heat exchange surfaces for transferring heat from the second refrigerant to air surrounding the heat exchange surfaces of said second condenser;

g. a second evaporator having an inlet coupled to the outlet of said condenser for receiving said second refrigerant in liquid form, said second evaporator being in heat exchange contact with the air to be refrigerated for evaporating the second refrigerant to a gaseous form under relatively low pressure, said second evaporator having an outlet coupled to the pump inlet of said diaphragm pump for supplying the second refrigerant in gaseous form under relatively low pressure and h. a blower for blowing the air to be refrigerated over the second evaporator.

2. A refrigeration system as recited by Claim 1 wherein said first and second condensers are disposed adjacent to one another in serial fashion for allowing said precooled air stream to pass over the heat exchange surfaces of both said first condenser and said second condenser.

3. A refrigeration system as recited by claim 2 further including a housing disposed outside the enclosed space to be refrigerated, the housing including a first opening, a second opening, and a third opening, said first and second condensers being supported proximate to said first opening for receiving an evaporatively cooled air stream drawn into the housing through the first opening of said housing, said first evaporator being supported proximate to the second opening of said housing for receiving an air stream drawn into said housing through the second opening thereof, and wherein said fan of said precooler means is supported proximate to the third opening in said housing for drawing the first and second air streams into said housing through the first and second openings thereof, respectively, and exhausting the first and second air streams through the third opening of said housing.

* * * * *